United States Patent
Okuyama et al.

(10) Patent No.: US 9,938,477 B2
(45) Date of Patent: Apr. 10, 2018

(54) ASHLESS-COAL PRODUCTION DEVICE, AND ASHLESS-COAL PRODUCTION METHOD

(71) Applicant: KOBE STEEL, LTD., Kobe-shi (JP)

(72) Inventors: Noriyuki Okuyama, Hyogo (JP); Koji Sakai, Hyogo (JP); Takuya Yoshida, Hyogo (JP); Shigeru Kinoshita, Hyogo (JP); Maki Hamaguchi, Hyogo (JP)

(73) Assignee: Kobe Steel, Ltd., Kobe-shi (JP)

( * ) Notice: Subject to any disclaimer, the term of this patent is extended or adjusted under 35 U.S.C. 154(b) by 52 days.

(21) Appl. No.: 14/770,661

(22) PCT Filed: Mar. 26, 2014

(86) PCT No.: PCT/JP2014/058674
§ 371 (c)(1),
(2) Date: Aug. 26, 2015

(87) PCT Pub. No.: WO2014/157409
PCT Pub. Date: Oct. 2, 2014

(65) Prior Publication Data
US 2016/0002551 A1 Jan. 7, 2016

(30) Foreign Application Priority Data
Mar. 28, 2013 (JP) .................................. 2013-069033

(51) Int. Cl.
*B01J 10/00* (2006.01)
*B01D 11/04* (2006.01)
(Continued)

(52) U.S. Cl.
CPC .................. *C10L 5/04* (2013.01); *C10L 9/00* (2013.01); *C10L 2290/06* (2013.01);
(Continued)

(58) Field of Classification Search
CPC ... C10B 57/04; C10L 5/04; C10L 9/02; B01D 53/01
(Continued)

(56) References Cited

U.S. PATENT DOCUMENTS 4,374,725 A 2/1983 Whitehurst et al.
8,075,643 B2 * 12/2011 Sugita ........................ C10L 9/10
44/621

(Continued)

FOREIGN PATENT DOCUMENTS

CN 102911692 A 2/2013
JP 54-16502 A 2/1979
(Continued)

OTHER PUBLICATIONS

International Search Report issued Jun. 24, 2014 in PCT/JP2014/058674 (with partial English language translation).
(Continued)

*Primary Examiner* — Monzer R Chorbaji
(74) *Attorney, Agent, or Firm* — Oblon, McClelland, Maier & Neustadt, L.L.P.

(57) ABSTRACT

A production apparatus of an ashless coal includes a preheater, an extraction tank, a feed pipe, a solid-liquid separator and a solvent separator. The preheater heats a solvent. The extraction tank extracts a coal component soluble in the solvent from a slurry including a mixture of a coal and the solvent heated by the preheater. The coal feeding unit feeds the coal to the feed pipe by pressuring a feed part to the feed pipe such that the solvent does not flow back. The solid-liquid separator separates a solution part containing the coal component from the slurry. The solvent separator evaporates and separates the solvent from the solution part to obtain an ashless coal.

6 Claims, 4 Drawing Sheets

(51) Int. Cl.
*C10L 5/02* (2006.01)
*C10L 5/04* (2006.01)
*C10L 9/00* (2006.01)

(52) U.S. Cl.
CPC ....... *C10L 2290/08* (2013.01); *C10L 2290/12* (2013.01); *C10L 2290/22* (2013.01); *C10L 2290/24* (2013.01); *C10L 2290/46* (2013.01); *C10L 2290/54* (2013.01); *C10L 2290/543* (2013.01); *C10L 2290/544* (2013.01); *Y02E 50/30* (2013.01)

(58) Field of Classification Search
USPC .......... 422/187, 255, 261, 285; 44/592, 620, 44/627; 423/228
See application file for complete search history.

(56) References Cited

U.S. PATENT DOCUMENTS

| | | | | |
|---|---|---|---|---|
| 2005/0097814 | A1* | 5/2005 | Sugita | C10L 9/10 44/620 |
| 2010/0006477 | A1* | 1/2010 | Okuyama | C10L 9/10 208/428 |
| 2010/0133084 | A1* | 6/2010 | Burnside | C10B 57/04 201/2.5 |
| 2011/0041393 | A1* | 2/2011 | Sugita | C10L 5/00 44/626 |

FOREIGN PATENT DOCUMENTS

| | | |
|---|---|---|
| JP | 2009-126951 A | 6/2009 |
| JP | 2009-227718 A | 10/2009 |
| JP | 2013-6907 A | 1/2013 |
| WO | WO 2012/176896 A1 | 12/2012 |

OTHER PUBLICATIONS

Written Opinion dated Jun. 24, 2014 in PCT/JP2014/058674 (with English language translation).

Noriyuki Okuyama, et al., "Development of a Hyper-coal Process to Produce Ash-free Coal" Kobe Steel Engineering Reports, vol. 56, No. 2, Aug. 2006, pp. 15-22.

Li-hua Fan, et al., Research Progress on Ash-Free Coal Preparation and Application., Coal Science and Technology, China Academic Journal Electronic Publishing House, vol. 39, No. 3, Mar. 2011, pp. 120-124. (with English abstract).

* cited by examiner

ASHLESS-COAL PRODUCTION DEVICE, AND ASHLESS-COAL PRODUCTION METHOD

TECHNICAL FIELD

The present invention relates to a production apparatus of an ashless coal and a method for producing an ashless coal, for obtaining an ashless coal in which ash components have been removed from a coal.

BACKGROUND ART

As a method for producing an ashless coal, there is the method described in, for example, Patent Document 1. This method for producing an ashless coal includes a slurry preparation step of mixing a coal and a solvent to prepare a slurry, an extraction step of heating the slurry obtained in the slurry preparation step to extract coal components soluble in the solvent, a separation step of separating a solution part containing the coal components from the slurry in which the coal components have been extracted in the extraction step, and an ashless coal acquirement step of separating the solvent from the solution part which has been separated in the separation step to obtain an ashless coal (HPC).

PRIOR ART DOCUMENT

Patent Documents

Patent Document 1: JP-A-2009-227718

SUMMARY OF THE INVENTION

Problem that the Invention is to Solve

As mentioned above, an ashless coal is obtained by separating a solvent from a solution part containing coal components soluble in the solvent. Therefore, the yield of an ashless coal depends on the proportion (hereinafter referred to as an extraction rate) of the coal components soluble in the solvent, and the improvement of the extraction rate becomes an important problem in an ashless coal production process. For example, in the method for producing an ashless coal described in Patent Document 1, an extraction rate is increased by using a non-hydrogen donating solvent having excellent affinity with a coal as a solvent and additionally setting an extraction temperature and an extraction time to desired values, but further improvement of the extraction rate is desired.

The present invention has been made in view of the above actual situation, and an object is to provide a production apparatus of an ashless coal and a method for producing an ashless coal, that can increase an extraction rate and can improve the yield of an ashless coal.

The term "yield" used in the present application means a ratio of a mass of an ashless coal produced to a mass of a coal as a raw material, and may be replaced with "production efficiency".

Means for Solving the Problems

In order to solve the above problems, the production apparatus of an ashless coal according to the present invention includes: a preheater that heats a solvent; an extraction tank that extracts a coal component soluble in the solvent from a slurry comprising a mixture of a coal and the solvent which has been heated by the preheater; a feed pipe one end of which is connected to the extraction tank through the preheater; a coal feeding unit that feeds the coal to the feed pipe by pressuring a feed part to the feed pipe such that the solvent does not flow back, the coal feeding unit being connected to the feed pipe on a downstream side of the preheater; a solid-liquid separator that separates a solution part containing the coal component from the slurry from which the coal component has been extracted in the extraction tank; and a solvent separator that evaporates and separates the solvent from the solution part which has been separated by the solid-liquid separator to obtain an ashless coal.

In addition, the method for producing an ashless coal according to the present invention obtains an ashless coal from a slurry comprising a mixture of a coal and a solvent, the method includes: a heating step of heating a solvent; a coal mixing step of feeding a coal to a feed pipe through which the solvent which has been heated in the heating step flows by pressuring a feed part to the feed pipe such that the solvent does not flow back, thereby mixing the coal and solvent which have been fed, and forming a slurry; an extraction step of extracting a coal component soluble in the solvent from the slurry which has been obtained in the coal mixing step; a separation step of separating a solution part containing the coal component from the slurry from which the coal component has been extracted in the extraction step; and an ashless coal acquirement step of evaporating and separating the solvent from the solution part which has been separated in the separation step, thereby obtaining an ashless coal.

Advantageous Effects of the Invention

According to the present invention, a production apparatus of an ashless coal and a method for producing an ashless coal, that can increase an extraction rate and can improve the yield of an ashless coal, can be provided.

EMBODIMENTS FOR CARRYING OUT THE INVENTION

Figure 1:
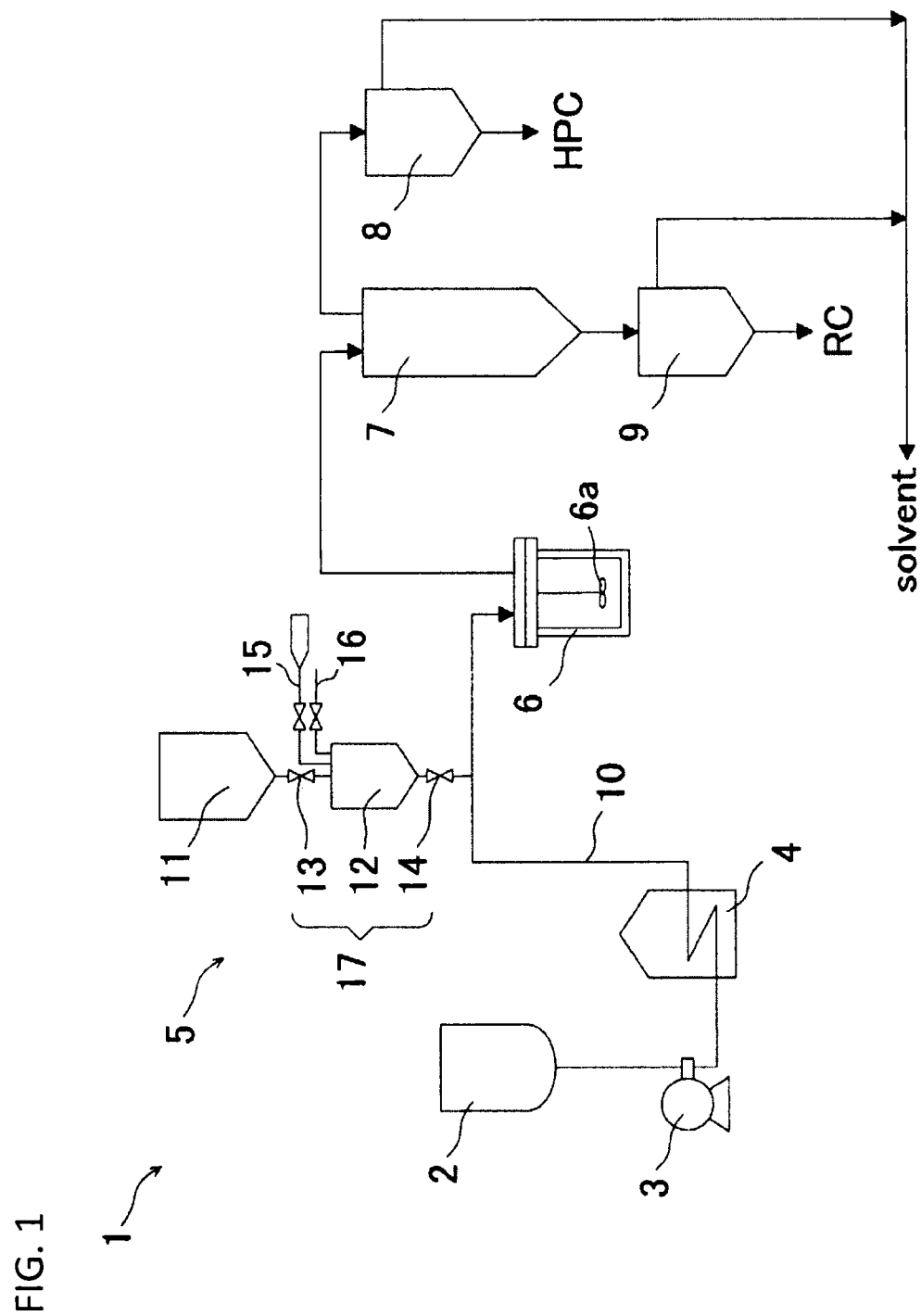
FIG. 1 is a schematic view showing a production apparatus of an ashless coal according to a first embodiment of the present invention.

In the following, an embodiment for carrying out the present invention is illustrated in detail by reference to the drawings. FIG. 1 is a schematic view showing a production apparatus of an ashless coal according to a first embodiment of the present invention.

First Embodiment

Constitution of Production Apparatus 1 of Ashless Coal

As shown in FIG. 1, a production apparatus 1 of an ashless coal according to the first embodiment of the present invention includes a solvent tank 2, a pump 3, a preheater 4, a lock hopper 5 (coal feeding unit), an extraction tank 6, a gravitational settling tank 7 (solid-liquid separator), and solvent separators 8 and 9. The solvent tank 2 is connected to the extraction tank 6 through a feed pipe 10.

(Pump 3)

The pump 3 transports a solvent stored in the solvent tank 2 to the extraction tank 6 though the feed pipe 10, and is provided in the feed pipe 10. The solvent is transported to the extraction tank 6 in a turbulent flow state by the pump 3. The term "turbulent flow state" used in the present application means the state that Reynolds number Re is 2100 or more, more preferably the state that Reynolds number Re is 4000 or more. The solvent may be transported in a laminar flow state, that is, the state that Reynolds number Re is less than 2100.

(Preheater 4)

The preheater 4 heats the solvent which has been transported by the pump 3, and is provided in the feed pipe 10 on a downstream side of the pump 3. The preheater 4 is not particularly limited so long as it can heat the solvent. A heat exchanger is generally used, and the solvent which flows in the feed pipe 10 is heated by heat exchange when passing through the preheater 4. The preheater 4 used is, for example, a preheater having a capacity that can heat the solvent at a heating rate of 10 to 100° C. per minute, although depending on a molecular weight of the solvent. In the present embodiment, the solvent which has been transported by the pump 3 is heated, but the solvent which has previously been heated by the preheated 4 may be transported by the pump 3. That is, the position of the pump 3 and that of the preheater 4 may be reversed.

(Lock Hopper 5)

The lock hopper 5 (coal feeding unit) is a unit that feeds a coal to the feed pipe 10 having high inner pressure (for example, 1.0 to 5.0 MPa), and is connected to the feed pipe 10 on a downstream side of the pump 3 and the preheater 4. By feeding the coal to the feed pipe 10 from the lock hopper 5, the solvent and the coal are mixed in the feed pipe 10.

The lock hopper 5 includes an ordinary pressure hopper 11 to be used in an ordinary pressure state, a pressurization hopper 12 to be used in an ordinary pressure state and a pressurized state, a valve 13 provided in a connection part that connects the ordinary pressure hopper 11 and the pressurization hopper 12, and a valve 14 provided in a connection part that connects the pressurization hopper 12 and the feed pipe 10. A pressurization line 15 feeding a gas such as a nitrogen gas and an exhaust line 16 exhausting the gas are connected to the pressurization hopper 12.

The coal in the ordinary pressure hopper 11 is first transferred to the pressurization hopper 12 by opening the valve 13 in the state that the valve 14 is closed (in this case, the pressurization hopper 12 is in an ordinary pressure state). Next, the valve 13 is closed, and a gas such as a nitrogen gas is fed to the pressurization hopper 12 through the pressurization line 15. As a result, a space section of from the valve 13 to the valve 14, including the pressurization hopper 12 (hereinafter referred to as a feed section 17) is pressurized, and the pressurization hopper 12 becomes a pressurized state. In this case, it is preferred that the pressurization is performed such that the pressure of the feed section 17 is equal to or more than the pressure in the feed pipe 10. By opening the valve 14, the coal in the pressurization hopper 12 is fed to the feed pipe 10. In this way, because the feed section 17 of the lock hopper 5 is pressurized, the coal can be fed to the feed pipe 10 while preventing the solvent from flowing back to the lock hopper 5 from the feed pipe 10. The pressurization line 15 and the exhaust line 16 are connected to any one part of the feed section 17, and are not always required to be connected to the pressurization hopper 12.

The valve 13 and valve 14 are not particularly limited, and, for example, a gate valve, a ball valve, a flap valve and a rotary valve can be used. The lock hopper 5 is not limited to the constitution of the present embodiment, and may have other constitution so long as it can feed a coal to the feed pipe 10 while preventing that the solvent from flowing back to the lock hopper 5 from the feed pipe 10. Coal feeding unit other than the lock hopper may be used.

(Feed Pipe 10)

The feed pipe 10 is a feed pipe connecting the solvent tank 2 with the extraction tank 6. The solvent which has been heated in the preheater 4 and the coal which has been fed from the lock hopper 5 are mixed in the feed pipe 10 to form a slurry.

(Method for Producing Ashless Coal)

The method for producing an ashless coal according to the present invention is described. The method for producing an ashless coal according to the first embodiment of the present invention includes a transport step, a heating step, a coal mixing step, an extraction step, a separation step, and an ashless coal acquirement step, and as necessary, further includes a residual coal acquirement step.

(Transport Step)

The transport step is a step of transporting the solvent stored in the solvent tank 2 to a subsequent step by the pump 3, and the solvent is transported to the subsequent step in a turbulent flow state (by turning into turbulence) as mentioned above.

The solvent is not particularly limited so long as it dissolves a coal, and a bicyclic aromatic compound derived from a coal is preferably used. The bicyclic aromatic compound has a basic structure similar to a constituent element of a coal. Therefore, the affinity with the coal is high, and comparatively high extraction rate can be acquired. Examples of the bicyclic aromatic compound derived from a coal include methyl naphthalene oil, naphthalene oil and the like, that are a distillation oil of a by-product oil in producing a coke by carbonizing a coal.

The boiling point of the solvent is not particularly limited. For example, from the standpoint of an extraction rate in the extraction step, and a solvent recovery rate in the ashless coal acquirement step or residual coal acquirement step, solvents having a boiling point of 180 to 300° C., and particularly 230 to 280° C., are preferably used. On the other hand, in a case where the boiling point of the solvent is lower than 180° C., loss by evaporation is increased in the case of recovering the solvent in the ashless coal acquirement step or residual coal acquirement step, and there is concern that the recovery rate of the solvent is decreased. In the case where the boiling point of the solvent exceeds 300° C., separation of the coal and the solvent becomes difficult, and there is concern that the recovery rate of the solvent is decreased.

(Heating Step)

The heating step is a step of heating the solvent which has been transported by the pump 3, and is carried out in the preheater 4. In more detail, the heating is performed during the period when the solvent flowing in the feed pipe 10 passes through the preheater 4. From the standpoint of improvement of the extraction rate in the extraction step, the temperature of the solvent which has been heated by the preheater 4 is preferably 300 to 450° C., and more preferably 350 to 420° C. It is preferred that the temperature of the solvent which has been heated by the preheater 4 is equal to or higher than a temperature of the slurry (300 to 420° C.) in the extraction tank 6 mentioned below. The temperature of the solvent before passing through the preheater 4 is about 100° C. The heating time in the preheater 4 is not particularly limited, and is about 10 to 30 minutes. Therefore, the solvent is heated at a heating rate of about 10 to 100° C. per minute. The heating step is carried out under high pressure, and its pressure is preferably a range of 1.0 to 5.0 MPa although depending on a vapor pressure of the solvent. Unless the pressure is higher than the vapor pressure of the solvent, the solvent volatilizes and extraction of a coal becomes difficult in the extraction step.

The temperature of the solvent which has been heated by the preheater 4 means a temperature of the solvent flowing in the feed pipe 10 on a downstream side of the preheater 4, and in more detail, means a temperature of the solvent flowing in the feed pipe 10 on a downstream side of the preheater 4 and on an upstream side of the connection part with the lock hopper 5. It can be said that the temperature is a temperature of the solvent just before mixing with the coal which has been fed to the feed pipe 10 from the lock hopper 5.

In the present embodiment, the heating step is conducted after the transport step, but the heating step may be conducted before the transport step by changing the order of the pump 3 and the preheater 4.

(Coal Mixing Step)

The coal mixing step is a step of mixing a coal and a solvent to prepare a slurry, and is conducted in the feed pipe 10. In more detail, the step is conducted in the vicinity of a connection part between the feed pipe 10 and the lock hopper 5.

Coals having various qualities can be used as a raw material of the coal, and for example, bituminous coal, subbituminous coal and brown coal are preferably used. When the coals are classified by a grain size, finely pulverized coal is used. The term "finely pulverized coal" means a coal in which weight proportion of coals having a grain size of less than 1 mm is 80% or more based on the entire coals. Lump coal can be used. The "lump coal" used in the present application means a coal in which weight proportion of a coal having a grain size of 5 mm or more is 50% or more based on the entire coals. The lump coal has large grain size of a coal as compared with the finely pulverized coal. Therefore, separation rate in the separation step is increased, and settling separation can be conducted efficiently. In the case of verifying the grain size of the coal, e.g. whether or not the grain size (particle diameter) of coals is 5 mm or more, a screening test defined in, for example, JIS A 1102 can be used. For example, a sieve can be used for separation of the coal.

The coal which has been fed to the feed pipe 10 from the lock hopper 5 is mixed with a solvent of high temperature (300 to 450° C., and more preferably 350 to 420° C.) flowing in the feed pipe 10, followed by rapid temperature rising. The term "rapid temperature rising" means that the mixture is heated in a heating rate of, for example, 10 to 100° C. per second, and this heating rate is faster than the heating rate in the preheater 4. As a result, the temperature of a slurry including a mixture of the solvent and the coal reaches about 300 to 420° C. in a period of several seconds to several tens seconds (the temperature of the slurry is decreased than the temperature of the solvent which has been heated by the preheater 4 by sensible heat of the coal).

Because the solvent is transported in a turbulent flow state from the pump 3, the solvent vigorously collides with the coal which has been fed to the feed pipe 10. As a result, the coal is well dissolved, thereby improving an extraction rate. The slurry in which the solvent and the coal have been well mixed is formed.

(Extraction Step)

The extraction step is a step of extracting coal components soluble in the solvent (hereinafter referred to as solvent-soluble components) from the slurry which has been obtained in the coal mixing step, and is mainly carried out in the extraction tank 6. In more detail, the slurry which has been obtained in the coal mixing step is fed to the extraction tank 6, and the extraction is performed at a predetermined temperature while stirring with a stirrer 6a provided in the extraction tank 6. The solvent-soluble components used herein are coal components capable of being dissolved in the solvent, and are mainly derived from organic components in the coal having relatively small molecular weight, in which a crosslinking structure does not grow. Because the extraction is performed simultaneously with the mixing of high temperature solvent and the coal, the extraction is also performed in the feed pipe 10.

The temperature of the slurry in the extraction step is 300 to 420° C., and preferably from 350 to 400° C., from the standpoint of the improvement of an extraction rate. That is, the temperature of the slurry in the coal mixing step is tried to be maintained in the extraction step. The temperature lower than 300° C. is insufficient in order to weaken the bond between the molecules constituting the coal, and the extraction rate is decreased. On the other hand, even at a temperature higher than 420° C., a thermal decomposition reaction of the coal becomes active, and recombination of thermally decomposed radicals formed occurs, leading to the decrease of the extraction rate. At a temperature of 300 to 420° C., the bond between the molecules constituting the coal is relaxed, mild thermal decomposition occurs, and the extraction rate is increased. Particularly, the highest extraction rate is achieved at 350 to 400° C.

The extraction step is carried out in the presence of an inert gas. The inert gas to be used in the extraction step is not particularly limited, but it is preferred to use inexpensive nitrogen. The pressure in the extraction step is preferably a range of 1.0 to 3.0 MPa, although depending on the temperature in the extraction and vapor pressure of the solvent. The heating time (extraction time) in the extraction step is not particularly limited, but from the standpoint of obtaining sufficient dissolution and sufficient extraction rate, a range of 5 to 60 minutes is preferred, and a range of 20 to 40 minutes is more preferred.

(Separation Step)

The separation step is a step of separating the slurry which has been obtained in the extraction step into a solution part containing solvent-soluble components and solid-content concentrated liquid containing coal components insoluble in the solvent (hereinafter referred to as solvent-insoluble components) by the gravitational settling method, and is carried out in the gravitational settling tank 7. The gravitational settling method is a separation method of settling solid contents by utilizing gravity, thereby performing solid-liquid separation. The solution part containing the solvent-soluble components can be discharged from the upper part of the tank and the solid-content concentrated liquid containing the solvent-insoluble components can be discharged from the lower part of the tank, while continuously feeding the slurry to the tank, and thus, continuous separation treatment becomes possible. The solvent-insoluble components used herein mean coal components such as ash components that are not dissolved in the solvent and remain even though the extraction of the coal components is carried out by the solvent, and a coal containing the ash components, have relatively large molecular weight, and are derived from organic components in which crosslinking structure has grown.

The solution part containing the solvent-soluble components collects in the upper part of the gravitational settling tank 7, and as necessary, after filtering with a filter unit (not shown), it is discharged to the solvent separator 8. On the other hand, the solid-content concentrated liquid containing the solid-insoluble components collects in the lower part of the gravitational settling tank 7, and it is discharged to the solvent separator 9. The separation method is not limited to the gravitational settling method, and the separation may be conducted by, for example, a filtration method or a centrifugal separation method. In such a case, a filter device, a centrifugal separator or the like is used as the solid-liquid separator.

The retention time of the slurry in the gravitational settling tank 7 is not particularly limited, but settling separation can be conducted in a period of about 30 to 120 minutes. In the case where a lump coal is used as the coal, settling separation is performed efficiently. Therefore, the retention time of the slurry in the gravitational settling tank 7 can be shortened.

It is preferred that the inside of the gravitational settling tank 7 is heated and pressurized in order to prevent reprecipitation of the solvent-soluble components. The heating temperature is preferably a range of 300 to 420° C., and the pressure is preferably a range of 1.0 to 3.0 MPa, and more preferably a range of 1.7 to 2.3 MPa.

(Ashless Coal Acquirement Step)

The ashless coal acquirement step is a step of evaporating and separating the solvent from the solution part containing the solvent-soluble components which has been separated in the separation step to obtain an ashless coal (HPC), and is carried out in the solvent separator 8.

The evaporative separation is a separation method examples of which include a common distillation process, evaporation process (such as spray dry process) or the like. The solvent which has been separated and recovered can be circulated to the feed pipe 10 on an upstream side of the preheater 4, and can be repeatedly used. By the separation and recovery of the solvent, an ashless coal substantially free of ash components can be obtained from the solution part. The ashless coal contains almost no ash components, is absolutely free of moisture, and offers a calorific value higher than a raw material coal. In addition, the ashless coal has an extensive improvement in coal plastic properties which are especially important for a raw material of steelmaking coke, and shows far excellent performance (flowability) as compared with the case of the raw material coal. Therefore, the ashless coal can be used as a blended coal of a raw material for making coke. The ashless coal means a coal in which the amount of ash components is 5 wt % or less, and preferably 3 wt % or less.

(Residual Coal Acquirement Step)

The residual coal (by-product coal) acquirement step is carried out as necessary, is a step of evaporating and separating the solvent from the solid-content concentrated liquid containing solvent-insoluble components which has been separated in the separation step to obtain a residual coal (RC), and is carried out in the solvent separator 9. The residual coal is further called a by-product coal.

As the method for separating the solvent from the solid-content concentrated liquid, usable examples thereof include a common distillation process, evaporation process (such as spray dry process) or the like, similar to the case of the ashless coal acquirement step mentioned above. The solvent which has been separated and recovered can be circulated to the feed pipe 10 on an upstream side of the preheater 4, and can be repeatedly used. By the separation and recovery of the solvent, the residual coal in which the solvent-insoluble components containing ash components and the like have been concentrated can be obtained from the solid-content concentrated liquid. The residual coal does not show plastic properties. However, because oxygen-containing functional groups are eliminated, in the case of using the residual coal as a blended coal, the residual coal does not impair plastic properties of other coals contained in the blended coal. Therefore, the residual coal can be used as a part of the blended coal as a raw material for making coke. The residual coal may be disposed without recovery.

(Coal Component Extraction Experiment)

Figure 2:
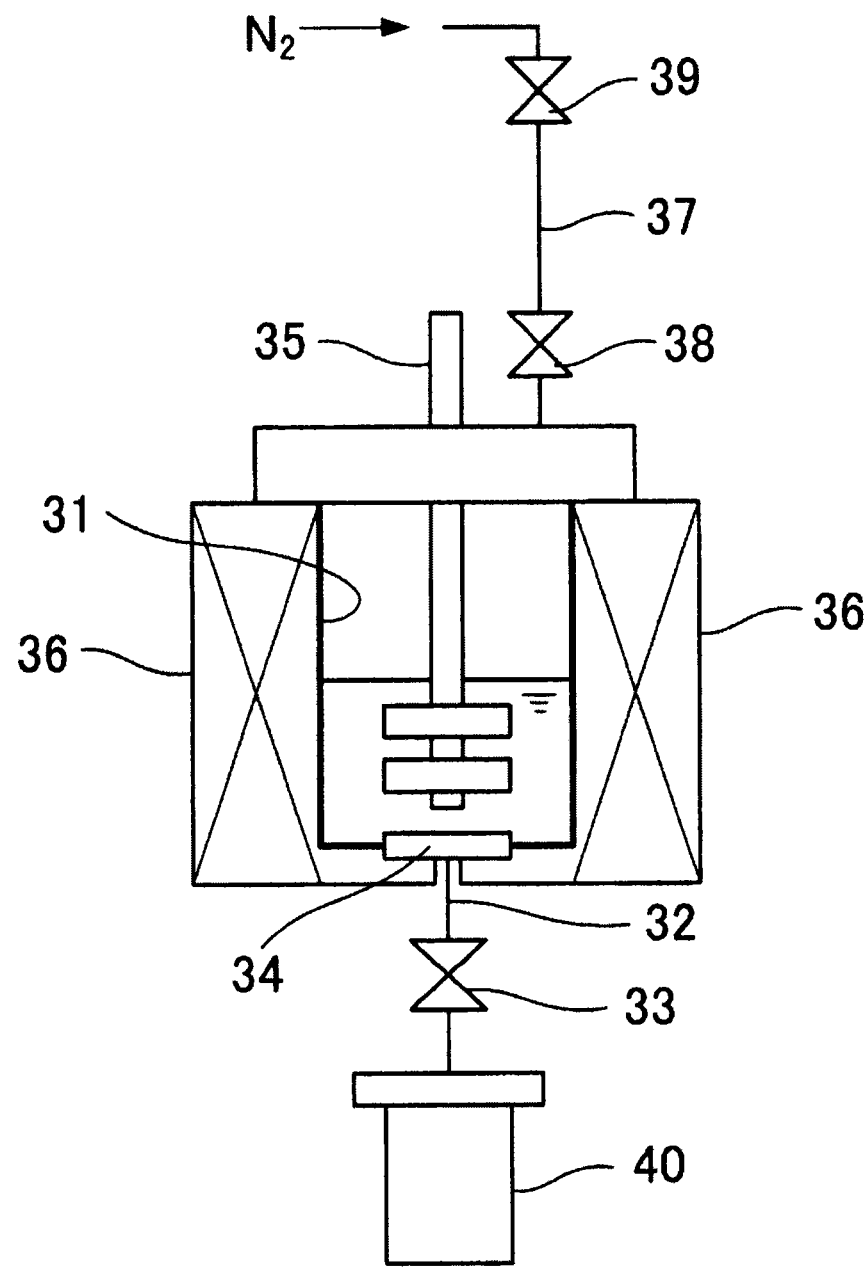
FIG. 2 is a view showing an experimental equipment of a coal component extraction experiment.

Coal component extraction experiment of extracting coal components soluble in a solvent from a slurry including a mixture of a coal and a solvent was conducted using the experimental equipment shown in FIG. 2. As the procedure, in a vessel 31 as an autoclave having a capacity of 10 L, the temperature of the slurry in which the coal and the solvent have been mixed was increased to an extraction temperature of 380° C. under a pressure of 2.0 MPa, and coal components were extracted over an extraction time of 60 minutes. Thereafter, a valve 33 provided in a nozzle 32 connected to the bottom of the vessel 31 was opened, the slurry was hot-filtered with a filter 34, and a filtrate was received on a receiver 40. The weight of a residue on the filter 34 was measured, and an extraction rate was calculated. The extraction rate used herein means the proportion of dehydrated ash-free basis (daf basis) amount of coal components which have been extracted to the dehydrated ash-free basis amount of a coal which has been used in the experiment. The dehydrated ash-free basis amount is an amount obtained by subtracting amounts of ash components and moisture which are obtained by industrial analysis from the actual weight. The dehydrated ash-free basis amount of the coal components which have been extracted is obtained by subtracting dehydrated ash-free basis amount of residues from dehydrated ash-free basis amount of the coal which has been used in the experiment. In the experiment, a solvent including a bicyclic aromatic compound as a main component was used.

In the experiment, the temperature of the slurry was increased by the following three methods. (1) A slurry including a mixture of a coal and a solvent is placed in the vessel 31, and the temperature of the slurry is increased to an extraction temperature (380° C.) by maximizing the output of a heater 36 while stirring with a stirrer 35. (2) A slurry including a mixture of a coal and a solvent is placed in the vessel 31, and the temperature of the slurry is increased to an extraction temperature (380° C.) while stirring with the stirrer 35 and adjusting the output of the heater 36 such that a temperature rising rate of the slurry is 3° C./min. (3) A solvent is heated to an extraction temperature (380° C.) or higher in the vessel 31, and additionally, a coal is added to a pipe 37 connected to the upper part of the vessel 31 in an ordinary temperature state; and two valves 38 and 39 provided in the pipe 37 are opened to introduce nitrogen gas in the pipe 37, thereby the coal in the pipe 37 is added dropwise to the solvent, and the temperature is instantly increased to an extraction temperature (380° C.). The solvent is contained in the coal to form a paste such that the coal in the pipe 37 is likely to be added dropwise to the solvent.

The experiments were conducted under the condition that the concentration of the coal in the slurry is 4.2 wt % and the condition that the concentration of the coal in the slurry is 20 wt %, respectively, as the mixing condition of the coal and the solvent, respectively. In the temperature rising method (3) in which the coal is added dropwise to the solvent, the amount of the solvent in the vessel 31 was adjusted such that the concentration of the coal in the slurry including the solvent used for forming the coal into a paste state is the concentration mentioned above.

Figure 3:
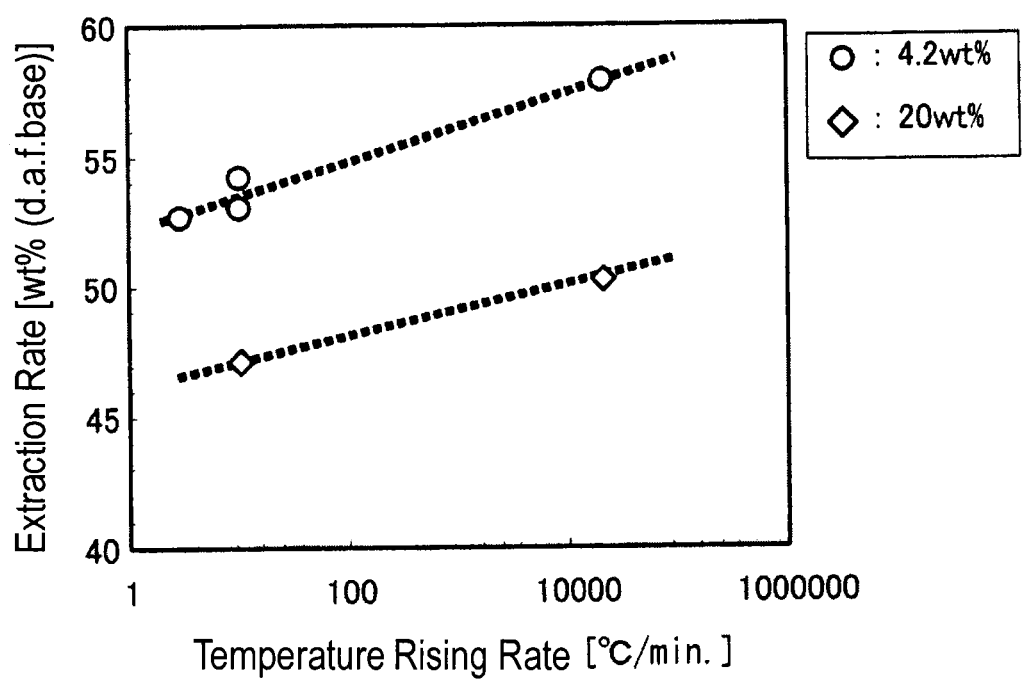
FIG. 3 is a view showing experimental results of the coal component extraction experiment.

The experimental results are shown in FIG. 3. In the temperature rising method (1) in which the temperature of the slurry is increased to an extraction temperature by maximizing the output of the heater 36, the temperature rising rate of the slurry was about 10° C./min. In the temperature rising method (3) in which the coal of an ordinary temperature is added dropwise to the solvent which has been heated to a temperature equal to or higher than the extraction temperature to instantly increase the temperature to the extraction temperature, the temperature of the slurry instantly reached the extraction temperature (380° C.), and the temperature rising rate of the slurry was about 21000° C./min. When the temperature rising rate of the slurry was increased from 3° C./min to 21000° C./min under the mixing condition that the concentration of the coal in the slurry becomes 4.2 wt %, the extraction rate was increased from 52.7 wt % to 57.8 wt %. When the temperature rising rate of the slurry was increased from 10° C./min to 21000° C./min under the mixing condition that the concentration of the coal in the slurry becomes 20 wt %, the extraction rate was increased from 47.1 wt % to 50.1 wt %. Therefore, it is found that in any of the mixing conditions, when the temperature rising rate of the slurry increases, the extraction rate increases.

(Effects)

The effect of the production apparatus 1 of an ashless coal is explained below. In the production apparatus 1 of an ashless coal according to the first embodiment of the present invention, the lock hopper 5 (coal feeding unit) is connected to the feed pipe 10 on a downstream side of the preheater 4. Therefore, the coal is fed into the feed pipe 10 through which a high temperature solvent which has been heated by the preheater 4 passes, and the temperature of the coal is rapidly increased. By rapidly increasing the temperature of the coal, the proportion of coal components to be extracted in the extraction tank 6, that is, the extraction rate, is improved. As a result, it becomes possible to improve the yield of an ashless coal.

The coal components soluble in a solvent include a coal component which is immediately dissolved by temperature rising, and a coal component which is dissolved by slowly aging in, for example, the extraction tank 6 after temperature rising. The coal component which is dissolved by slowly aging is likely to be dissolved by rapid temperature rising, and the extraction rate of the coal is improved.

The production apparatus 1 of an ashless coal further includes the pump 3 that is provided in the feed pipe 10 on an upstream side of the lock hopper 5 (coal feeding unit) and transports the solvent to the extraction tank 6 in a turbulent flow state. Therefore, the solvent which has been transported in a turbulent flow state violently collides with the coal which has been fed into the feed pipe 10. As a result, extraction of the coal components further progresses.

Furthermore, by transporting the solvent in a turbulent flow state, the solvent and the cool are well mixed, and extraction of the coal components progresses quickly. Therefore, the extraction time can be shortened, and apparatus cost and operation cost can be reduced.

In the production apparatus 1 of an ashless coal, the temperature of the solvent which has been heated by the preheater 4 is 300 to 450° C. Therefore, the temperature of the solvent which flows in the feed pipe 10 on a downstream side of the preheater 4 is 300 to 450° C. As a result, it becomes possible to rapidly increase the temperature of the slurry including a mixture of the coal and the solvent to a temperature of about 300 to 420° C. which is a temperature at which high extraction rate is obtained, and the extraction rate can be further improved.

In the production apparatus 1 of an ashless coal, the preheater 4 heats the solvent to a temperature equal to or higher than the temperature of the slurry (300 to 420° C.) in the extraction tank 6. As a result, it becomes possible to rapidly increase the temperature of the slurry including a mixture of the coal and the solvent to a temperature of about 300 to 420° C. which is a temperature at which high extraction rate is obtained, and the extraction rate can be further improved.

The production method of an ashless coal in the present invention includes a heating step, a coal mixing step, an extraction step, a separation step, and an ashless coal acquirement step. By the production method mentioned above, the extraction rate can be increased, and the yield of an ashless coal can be improved. As a result, an ashless coal can be produced efficiently and inexpensively.

The production method of an ashless coal in the present invention further includes a transport step that transports the solvent to the coal mixing step in a turbulent flow state. By further including the transport step, the extraction rate can be further increased. As a result, the yield of an ashless coal can be improved, and thus, the ashless coal can be produced efficiently and inexpensively.

In the heating step, the solvent is heated to a temperature equal to or higher than the temperature of the slurry (300 to 420° C.) in the extraction step. This can further increase the extraction rate and can further improve the yield of an ashless coal. As a result, an ashless coal can be produced efficiently and inexpensively.

Modification Examples

Figure 4:
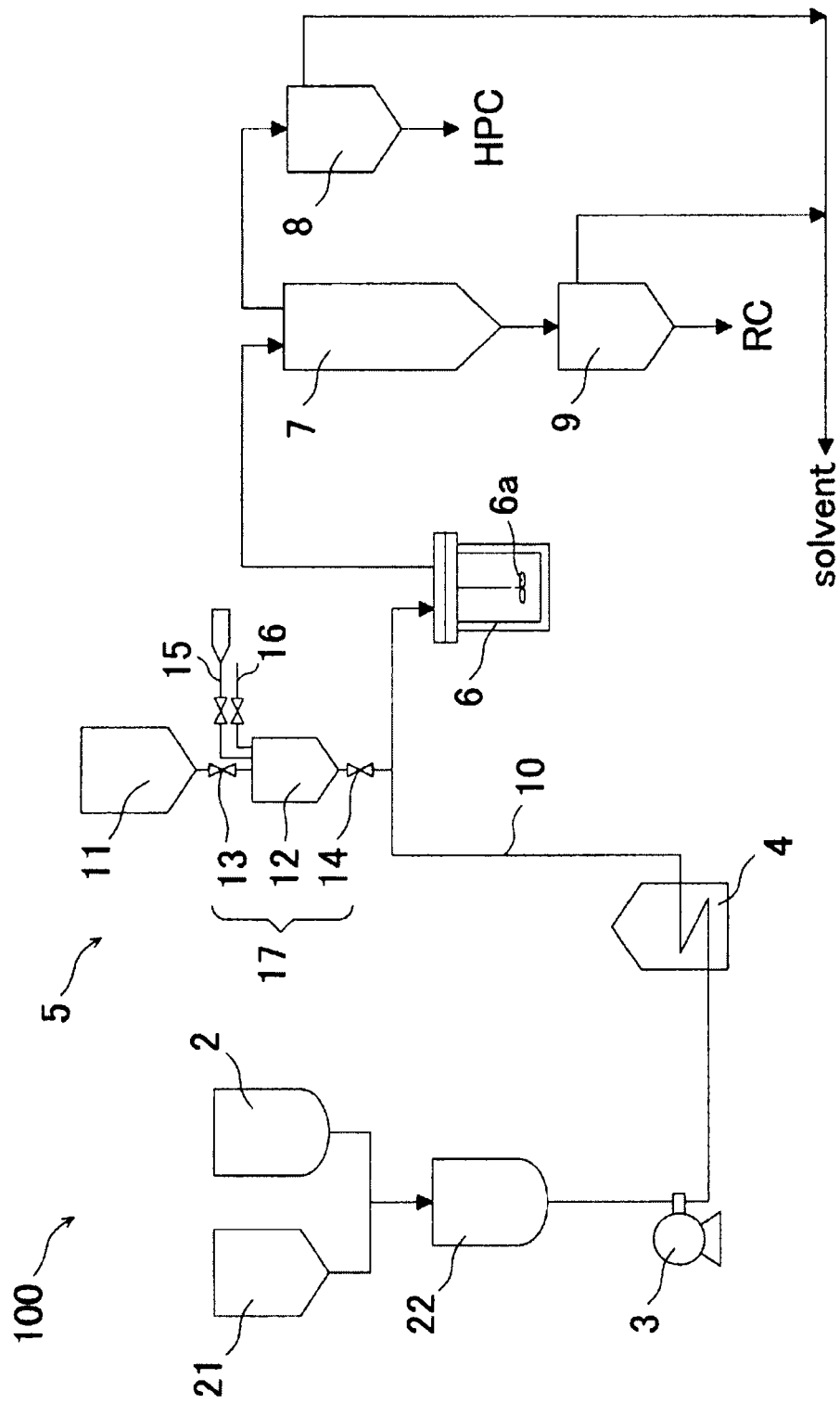
FIG. 4 is a schematic view showing a production apparatus of an ashless coal according to a modification example of the present invention.

Differences between a modification example of a production apparatus of an ashless coal and the first embodiment are described below by reference to FIG. 4. As shown in FIG. 4, a production apparatus 100 of an ashless coal in the modification example further includes a hopper 21 that stores a coal and a slurry preparation tank 22 that prepares a slurry by mixing a coal and a solvent. The hopper 21 and slurry preparation tank 22 are connected to the feed pipe 10 on an upstream side of the pump 3. The production method of an ashless coal in the modification example further includes a slurry preparation step which is carried out in the slurry preparation tank 22. In FIG. 4, the same parts as in the production apparatus 1 of an ashless coal according to the first embodiment have the same reference numbers.

The slurry preparation step is a step of mixing a coal and a solvent to prepare a slurry. Coal finely pulverized is used as the coal, and a lump coal cannot be used. In a case where a lump coal is used, the pump 3 clogs, and the slurry which has been prepared in the slurry preparation step cannot be transported to a subsequent step.

(Effects of Modification Example)

The production apparatus 100 of an ashless coal in the modification example includes the hopper 21 which stores a coal and a slurry preparation tank 22 which prepares a slurry by mixing a coal and a solvent, on an upstream side of the pump 3. Therefore, the coal can be fed to the production apparatus 100 of an ashless coal from two places of the hopper 21 and the lock hopper 5. As a result, even in the case where, for example, the situation that the coal is not fed from the lock hopper 5 for some factors occurs, the production of an ashless coal can be continued.

Although the embodiment of the present invention has been described in the foregoing, the present invention is not limited to the embodiments mentioned above, and can be carried out with various modifications within the scope of the claims.

Although the present invention has been described in detail and by reference to the specific embodiments, it is apparent to one skilled in the art that various modifications or changes can be made without departing the spirit and scope of the present invention.

This application is based on Japanese Patent Application No. 2013-069033 filed on Mar. 28, 2013, the entire contents of which are incorporated herein by reference in their entities.

DESCRIPTION OF REFERENCE NUMBERS

1: Production apparatus of ashless coal
2: Solvent tank
3: Pump
4: Preheater
5: Lock hopper (coal feeding unit)
6: Extraction tank
7: Gravitational settling tank (solid-liquid separator)
8, 9: Solvent separator
10: Feed pipe
17: Feed part
31: Vessel
32: Nozzle
33: Valve
34: Filter
35: Stirrer
36: Heater
37: Pipe
38, 39: Valve
40: Receiver

The invention claimed is:

1. A production apparatus of an ashless coal, comprising:
a preheater that heats a solvent during production of ashless coal;
an extraction tank that extracts a coal component soluble in the solvent from a slurry comprising a mixture of a coal and the solvent which has been heated by the preheater during the production of ashless coal;
a feed pipe having ends respectively connected to the extraction tank and the preheater, to feed heated solvent from the preheater to the extraction tank during the production of ashless coal;
a coal feeding unit that feeds the coal to the feed pipe during the production of ashless coal by pressuring a feed part to the feed pipe such that the solvent does not flow back, the coal feeding unit being connected to the feed pipe on a downstream side of the preheater such that coal mixes with the heated solvent in the feed pipe during the production of ashless coal;
a solid-liquid separator that separates a solution part containing the coal component from the slurry from which the coal component has been extracted in the extraction tank during the production of ashless coal; and
a solvent separator that evaporates and separates the solvent from the solution part which has been separated by the solid-liquid separator to obtain an ashless coal during the production of ashless coal.

2. The production apparatus of an ashless coal according to claim 1, further comprising a pump that is provided in the feed pipe on an upstream side of the coal feeding unit and transports the solvent to the extraction tank in a turbulent flow state during the production of ashless coal.

3. The production apparatus of an ashless coal according to claim 2, wherein a temperature of the solvent which has been heated by the preheater is 300° C. or more and 450° C. or less.

4. The production apparatus of an ashless coal according to claim 2, wherein the preheater heats the solvent to a temperature equal to or higher than a temperature of the slurry in the extraction tank.

5. The production apparatus of an ashless coal according to claim 1, wherein a temperature of the solvent which has been heated by the preheater is 300° C. or more and 450° C. or less.

6. The production apparatus of an ashless coal according to claim 1, wherein the preheater heats the solvent to a temperature equal to or higher than a temperature of the slurry in the extraction tank.

* * * * *